UNITED STATES PATENT OFFICE.

FERDINAND GERHARD WIECHMANN, OF NEW YORK, N. Y., ASSIGNOR TO FENOFORM CORPORATION, OF HASTINGS-UPON-HUDSON, NEW YORK, A CORPORATION OF NEW YORK.

PLASTIC MATERIAL AND PROCESS OF PREPARING SUCH PLASTIC MATERIAL.

1,067,855.     Specification of Letters Patent.     Patented July 22, 1913.

No Drawing.     Application filed November 13, 1909. Serial No. 527,754.

*To all whom it may concern:*

Be it known that I, FERDINAND GERHARD WIECHMANN, a citizen of the United States, residing at New York city, county and State of New York, have invented a Plastic Material and Process of Preparing Such Plastic Material, of which the following is a specification.

In prior Patents, Nos. 883,995, dated April 7, 1908, and 932,527, dated August 21, 1909, granted to me, I have described a plastic material and process for preparing said plastic material consisting of a combination of vegetable albumin and a solvent solution of animal casein. In my present invention, I substitute for the animal casein, rubber in some one of its commercial forms, and the combination of these two substances, after due manipulation as will be described, I may use alone or I may treat such combination by adding thereto a partial condensation product of phenol and formaldehyde as described by Dr. L. H. Baekeland in his English Patent No. 1921, dated January 28th, 1908, depending upon the character of the material that is to be produced.

To carry my invention into effect, I proceed as follows:

Example 1: I take 50 parts of rubber in any one of its commercial forms. This I manipulate as is usual in the rubber industry, to reduce it to the form of sheets. During the reduction, or subsequently, as is most convenient, I apply to the surface of the sheets 50 parts of the finely powdered vegetable albumin known in the art as vegetable ivory (from vegetable ivory nut) or corozo and continue the manipulation until the materials are thoroughly incorporated. This material is now in a plastic or moldable form for commercial use.

Example 2: I take 50 parts of rubber in any one of its commercial forms and add 50 parts of corozo as in Example 1. Simultaneously with the introduction of this vegetable albumin I may add sulfur, antimony, lithopone, cellulose, whiting, rouge or any of the materials commonly employed in the manufacture of rubber goods, either as coloring material, softening material, loading material or material which permits vulcanization. In this form the material is commercially useful for molding or other mechanical manipulation.

Example 3: I take 50 parts of rubber in any one of its commercial forms, 50 parts of vegetable ivory or corozo, and to this I add 50 parts of a partial condensation product of phenol and formaldehyde, now commonly known in the industry as "bakelite". The mixed materials are then heated and subjected to a force as for instance, pressure, to prevent disassociation of the condensation product and to reduce the compound to its final form. In its final form the compound is a hard insoluble product.

I wish it understood that I do not limit myself in any wise to the methods of mixing the materials. In place of rolling the rubber into sheets, I may effect the incorporation in any suitable mill or I may make partial solution of the rubber, for instance in nitrobenzol, and after first driving off, by slow heating, the nitrobenzol or other rubber solvent, incorporate the rubber and loading materials or the condensation product of phenol and formaldehyde, and then subject the materials to temperature and other physical force necessary to complete the condensation product without dissociation of said product.

Generally, I wish to have it understood that I believe I am the first to suggest the employment of a vegetable protein as a loading material for rubber, considered alone, or in connection with a binder having the general characteristics of a condensation product of phenol and formaldehyde.

In my application Ser. No. 541,336 I have claimed the process of compounding a vegetable albumin with rubber and with a product of reaction of phenol and formaldehyde while the claims of the present application are more specific and are drawn to the vegetable albumin known as vegetable ivory or corozo.

While I am not in a position at the present moment to make a positive statement, owing to the fact that the subject is one of great complication, the experiments which I have made lead me to believe that there is not only chemical combination between the condensation product of phenol and formaldehyde and the vegetable ivory, but also with the rubber, whereby a compound is formed which is entirely new and which has not heretofore existed either in nature or as an artificial product. In other words, I wish to make it clear that I consider the product as not being a mere mechanical incorporation of these materials, but rather a chemical union which simulates in some respects, the characteristics of solid solutions.

The process as described yields a solid product. I wish it understood that I may use most materials known in the rubber industry, for instance, petrolatum, wood oil, glycerin, vaseline, siccative oils, asphaltum, waxes, solutions of celluloids, gums, resins, or other materials to impart an elastic or semi-elastic character to the final product.

Having thus described my invention, what I claim is:

1. A new article of manufacture comprising vegetable ivory, rubber and a product of reaction of phenol and formaldehyde.

2. A process of forming a new product which consists in subjecting vegetable ivory and rubber to the action of a partial product of reaction of phenol and formaldehyde and heating the same to form the desired body.

3. A process of forming a new product which consists in subjecting vegetable ivory and rubber to the action of a partial product of reaction of phenol and formaldehyde and heating the same under pressure to form the desired body.

4. A new article of manufacture comprising rubber and finely divided vegetable ivory.

5. A new plastic composition comprising rubber and finely divided vegetable ivory, the vegetable ivory being present in an amount not less than the amount of rubber present.

In testimony whereof, I affix my signature, in the presence of two witnesses.

FERDINAND GERHARD WIECHMANN.

Witnesses:
W. A. TOWNER, Jr.,
ELIZABETH BARNETT.